(12) United States Patent
Wei et al.

(10) Patent No.: US 11,917,052 B2
(45) Date of Patent: Feb. 27, 2024

(54) HASH ALGORITHM METHOD, HASH ALGORITHM CIRCUIT, AND ELECTRONIC DEVICE

(71) Applicants: Beijing BOE Technology Development Co., Ltd., Beijing (CN); BOE TECHNOLOGY GROUP CO., LTD., Beijing (CN)

(72) Inventors: Xiangye Wei, Beijing (CN); Liming Xiu, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 296 days.

(21) Appl. No.: 17/333,110

(22) Filed: May 28, 2021

(65) Prior Publication Data

US 2022/0131684 A1 Apr. 28, 2022

(30) Foreign Application Priority Data

Oct. 23, 2020 (CN) .......................... 202011151967.1

(51) Int. Cl.
*H04L 29/06* (2006.01)
*H04L 9/06* (2006.01)
*G06F 5/01* (2006.01)

(52) U.S. Cl.
CPC .............. *H04L 9/0643* (2013.01); *G06F 5/01* (2013.01)

(58) Field of Classification Search
None
See application file for complete search history.

(56) References Cited

U.S. PATENT DOCUMENTS

| | | | | |
|---|---|---|---|---|
| 6,173,384 B1 * | 1/2001 | Weaver | ............... | G06F 16/9014 711/216 |
| 2003/0233515 A1 * | 12/2003 | Honig | ............... | G06F 16/90339 711/216 |
| 2006/0095654 A1 * | 5/2006 | Miller | .................... | G11C 15/00 711/216 |
| 2015/0280917 A1 * | 10/2015 | Wolrich | .............. | G06F 12/0811 713/193 |
| 2017/0102946 A1 * | 4/2017 | Truta | ....................... | G09C 1/00 |
| 2020/0310802 A1 * | 10/2020 | Shemy | ................ | G06F 9/30036 |
| 2022/0045852 A1 * | 2/2022 | Isshiki | .................. | H04L 9/3247 |
| 2022/0131684 A1 * | 4/2022 | Wei | ........................... | G06F 5/01 |

(Continued)

OTHER PUBLICATIONS

Mittelbach, A., Fischlin, M. (2021). Iterated Hash Functions. In: The Theory of Hash Functions and Random Oracles. Information Security and Cryptography. Springer, Cham. https://doi.org/10.1007/978-3-030-63287-8_13 (Year: 2021).*

(Continued)

*Primary Examiner* — Jeffery L Williams
(74) *Attorney, Agent, or Firm* — XSENSUS LLP

(57) ABSTRACT

The present disclosure provides a hash algorithm circuit, a hash algorithm method, and an electronic device. The hash algorithm circuit is used to reduce fixed-length parallel data, and the reduced identifier can be used as an index reference, an identifier ID, an address extension bit, information summary, and so on. The hash algorithm circuit has the characteristics of low power consumption, low cost, etc., and can be integrated in a digital circuit.

14 Claims, 4 Drawing Sheets

(56) References Cited

U.S. PATENT DOCUMENTS

2022/0188114 A1* 6/2022 Shemy ............... G06F 9/30043

OTHER PUBLICATIONS

Joux, A. (2004). Multicollisions in Iterated Hash Functions. Application to Cascaded Constructions. In: Franklin, M. (eds) Advances in Cryptology—CRYPTO 2004. CRYPTO 2004. Lecture Notes in Computer Science, vol. 3152. Springer, Berlin, Heidelberg. https://doi.org/10.1007/978-3-540-28628-8_19 (Year: 2004).*

Bart Rompay, "Analysis and Design of Cryptographic Hash Functions, MAC Algorithms and Block Ciphers", Katholieke Universiteit Leuven, Jun. 2004, p. 1-241. (Year: 2004).*

Sebastiann Indesteege, "Analysis and Design of Cryptographic Hash Functions", Katholieke Universiteit Leuven, May 2010, p. 1-308. (Year: 2010).*

Lai, X., Massey, J.L. (1993). Hash Functions Based on Block Ciphers. In: Rueppel, R.A. (eds) Advances in Cryptology—EUROCRYPT' 92. EUROCRYPT 1992. Lecture Notes in Computer Science, vol. 658. Springer, Berlin, Heidelberg. https://doi.org/10.1007/3-540-47555-9_5 (Year: 1993).*

Shen et al., "The SM3 Cryptographic Hash Function", Network Working Group, Internet Draft, Jan. 8, 2018, p. 1-140. (Year: 2018).*

Ao, Tianyong et al. "A Compact Hardware Implementation of SM3 Hash Function." 2014 IEEE 13th International Conference on Trust, Security and Privacy in Computing and Communications (2014): 846-850. (Year: 2014).*

Aleksandar Kircanski, "Cryptanalysis of Symmetric Cryptographic Primitives", Thesis, Concordia University School of Graduate Studies, 2013, p. 1-170. (Year: 2013).*

He et al., "Performance Evaluation and Comparison of Standard Cryptographic Algorithms and Chinese Cryptographic Algorithms", Thesis, Blekinge Institute of Technology, May 2019, p. 1-122. (Year: 2019).*

* cited by examiner

HASH ALGORITHM METHOD, HASH ALGORITHM CIRCUIT, AND ELECTRONIC DEVICE

CROSS REFERENCE TO RELATED APPLICATION(S)

The present application claims the benefit of and priority to Chinese Patent Application No. 202011151967.1 filed on Oct. 23, 2020, which is incorporated herein by reference in its entirety for all purposes.

TECHNICAL FIELD

The present disclosure relates to the field of circuit technology and, in particular, relates to a hash algorithm method, a hash algorithm circuit, and an electronic device.

BACKGROUND

Hash algorithms transform an input of any length into a fixed-length output through a hash routine, and the output is the hash value. Such a transformation is a compression mapping. That is, the space occupied by the hash value is usually much smaller than the space occupied by the input, and different inputs may be hashed into the same output. Thus, it is impossible to determine the unique input value from the hash value. Simply to say, a hash algorithm is a function that compresses a message of any length into a message digest of a fixed length.

The conventional hash algorithm is generally implemented by software, does not have physical isolation characteristics, and has the risk of being deciphered.

SUMMARY

In view of above, the purpose of the present disclosure is to provide a hash algorithm method, a hash algorithm circuit, and an electronic device.

Based on the above objective, a first aspect of the present disclosure provides a hash algorithm circuit, including:
  an input circuit unit, configured to receive data to be processed;
  at least one hash circuit unit, electrically coupled to the input circuit unit, wherein the hash circuit unit has a circuit structure arranged according to a preset hash algorithm, and is configured to form the data to be processed, passing through the hash circuit unit, into a target data, wherein the data length of the data to be processed is greater than the data length of the target data; and
  an output circuit unit electrically coupled to the at least one hash circuit unit and is configured to output the target data.

In some embodiments, the preset hash algorithm is selected from at least one of the following methods: direct addressing method, digital analysis method, middle-square method, folding method, random number method, and division-remainder method.

In some embodiments, the hash algorithm circuit includes a first hash circuit unit and a second hash circuit unit.

The first hash circuit unit is electrically coupled to the input circuit unit, and the first hash circuit unit has a circuit structure arranged according to a first preset hash algorithm, and is configured to form the data to be processed into an intermediate data, wherein the data length of the data to be processed is greater than the data length of the intermediate data.

The second hash circuit unit is electrically coupled to the first hash circuit unit, and the second hash circuit unit has a circuit structure arranged according to a second preset hash algorithm, and is configured to form the intermediate data into the target data, wherein the data length of the intermediate data is greater than the data length of the target data.

In some embodiments, the data to be processed is divided into n sequences.

The first hash circuit unit is configured to form, through its circuit structure, the n sequences into the intermediate data having k sequences according to the first preset hash algorithm, where n and k are both natural number, and $n>k$.

The second hash circuit unit is configured to form, through its circuit structure, the k sequences into the target data having u sequences according to the second preset hash algorithm, where u is a natural number, and $k>u$.

In some embodiments, the first hash circuit unit includes at least one of an exclusive OR circuit, a summation circuit, and a shift circuit.

In some embodiments, the second hash circuit unit includes at least one of an exclusive OR circuit, a summation circuit, and a shift circuit.

In some embodiments, the number of the exclusive OR circuit and the number of the summation circuit are determined according to a difference between n and u.

In some embodiments, the data to be processed is divided into 8 sequences, and the first hash circuit unit includes:
  a first exclusive OR circuit, configured to perform an exclusive OR operation on the first sequence and the second sequence of the data to be processed, so as to form a second intermediate sequence of the intermediate data;
  a first summation circuit, configured to perform a summation operation on the third sequence and the fourth sequence of the data to be processed, so as to form a fifth intermediate sequence of the intermediate data;
  a first left shift circuit, configured to shift the fifth sequence of the data to be processed to the left, so as to form the fourth intermediate sequence of the intermediate data;
  a second exclusive OR circuit, configured to perform an exclusive OR operation on the sixth sequence and the eighth sequence of the data to be processed, so as to form a third intermediate sequence of the intermediate data; and
  a first right shift circuit, configured to shift the seventh sequence of the data to be processed to the right, so as to form a first intermediate sequence of the intermediate data.

In some embodiments, the second hash circuit unit includes:
  a third exclusive OR circuit, electrically coupled to the first right shift circuit and the first exclusive OR circuit respectively, and configured to perform an exclusive OR operation on the first intermediate sequence and the second intermediate sequence, so as to form a first temporary sequence;
  a second summation circuit, electrically coupled to the second exclusive OR circuit and the first left shift circuit respectively, and configured to perform a summation operation on the third intermediate sequence and the fourth intermediate sequence, so as to form a second temporary sequence;

a second right shift circuit, electrically coupled to the second summation circuit, and configured to shift the second temporary sequence to the right by a first predetermined number of bits, so as to form a third temporary sequence;

a second left shift circuit, electrically coupled to the first summation circuit, and configured to shift the fifth intermediate sequence to the left by a second predetermined number of bits, so as to form a fourth temporary sequence;

a fourth exclusive OR circuit, electrically coupled to the third exclusive OR circuit and the second left shift circuit respectively, and configured to perform an exclusive OR operation on the first temporary sequence and the fourth temporary sequence, so as to form a fifth temporary sequence; and a fifth exclusive OR circuit, electrically coupled to the fourth exclusive OR circuit and the second right shift circuit, and configured to perform an exclusive OR operation on the third temporary sequence and the fifth temporary sequence, so as to form the target data.

A second aspect of the present disclosure provides a hash algorithm method implemented by a hash algorithm circuit. The hash algorithm circuit includes an input circuit unit, at least one hash circuit unit, and an output circuit unit electrically coupled in sequence.

The hash algorithm method includes:
using the input circuit unit to receive data to be processed;
using the at least one hash circuit unit to form the data to be processed, passing through the hash circuit unit, into a target data according to a preset hash algorithm, wherein the data length of the data to be processed is greater than the data length of the target data; and
outputting the target data by the output circuit unit.

In some embodiments, the preset hash algorithm is selected from at least one of the following methods: direct addressing method, digital analysis method, middle-square method, folding method, random number method, and division-remainder method.

In some embodiments, the hash algorithm circuit includes a first hash circuit unit electrically coupled to the input circuit unit and a second hash circuit unit electrically coupled to the first hash circuit unit.

The hash algorithm method also includes:
using the first hash circuit unit to form the data to be processed into an intermediate data according to a first preset hash algorithm, wherein the data length of the data to be processed is greater than the data length of the intermediate data; and
using the second hash circuit unit to form the intermediate data into the target data according to a second preset hash algorithm, wherein the data length of the intermediate data is greater than the data length of the target data.

In some embodiments, the data to be processed is divided into n sequences, and the hash algorithm method further includes:
using the first hash circuit unit to form, through its circuit structure, the n sequences into the intermediate data having k sequences according to the first preset hash algorithm, where n and k are both natural numbers, and n>k; and
using the second hash circuit unit to form, through its circuit structure, the k sequences into the target data having u sequences according to the second preset hash algorithm, where u is a natural number, and k>u.

In some embodiments, the first hash circuit unit includes at least one of an exclusive OR circuit, a summation circuit, and a shift circuit.

In some embodiments, the second hash circuit unit includes at least one of an exclusive OR circuit, a summation circuit, and a shift circuit.

In some embodiments, the hash algorithm method further includes: determining the number of the exclusive OR circuit and the number of the summation circuit according to the difference between n and u.

In some embodiments, the data to be processed is divided into 8 sequences. The first hash circuit unit includes a first exclusive OR circuit, a first summation circuit, a first left shift circuit, a second exclusive OR circuit, and a first right shift circuit.

The hash algorithm method also includes:
using the first exclusive OR circuit to perform an exclusive OR operation on the first sequence and the second sequence of the data to be processed, so as to form a second intermediate sequence of the intermediate data;
using the first summation circuit to perform a summation operation on the third sequence and the fourth sequence of the data to be processed, so as to form a fifth intermediate sequence of the intermediate data;
using the first left shift circuit to shift the fifth sequence of the data to be processed to the left, so as to form a fourth intermediate sequence of the intermediate data;
using a second exclusive OR circuit to perform an exclusive OR operation on the sixth sequence and the eighth sequence of the data to be processed, so as to form a third intermediate sequence of the intermediate data; and
using the first right shift circuit to shift the seventh sequence of the data to be processed to the right, so as to form a first intermediate sequence of the intermediate data.

In some embodiments, the second hash circuit unit includes a third exclusive OR circuit, a second summation circuit, a second right shift circuit, a second left shift circuit, a fourth exclusive OR circuit, and a fifth exclusive OR circuit. The third exclusive OR circuit is electrically coupled to the first right shift circuit and the first exclusive OR circuit respectively. The second summation circuit is electrically coupled to the second exclusive OR circuit and the first left shift circuit respectively. The second right shift circuit is electrically coupled to the second summation circuit. The second left shift circuit is electrically coupled to the first summation circuit. The fourth exclusive OR circuit is electrically coupled to the third exclusive OR circuit and the second left shift circuit respectively. The fifth exclusive OR circuit is electrically coupled to the fourth exclusive OR circuit and the second right shift circuit respectively.

The hash algorithm method also includes:
using the third exclusive OR circuit to perform an exclusive OR operation on the first intermediate sequence and the second intermediate sequence, so as to form a first temporary sequence;
using the second summation circuit to perform a summation operation on the third intermediate sequence and the fourth intermediate sequence, so as to form a second temporary sequence;
using the second right shift circuit to shift the second temporary sequence to the right by a first predetermined number of bits, so as to form a third temporary sequence;

using the second left shift circuit to shift the fifth intermediate sequence to the left by a second predetermined number of bits, so as to form a fourth temporary sequence;

using the fourth exclusive OR circuit to perform an exclusive OR operation on the first temporary sequence and the fourth temporary sequence, so as to form a fifth temporary sequence; and using the fifth exclusive OR circuit to perform an exclusive OR operation on the third temporary sequence and the fifth temporary sequence, so as to form the target data.

A third aspect of the present disclosure provides an electronic device including the hash algorithm circuit described in the first aspect.

BRIEF DESCRIPTION OF THE DRAWINGS

In order to explain the technical solutions in the present disclosure or the prior art more clearly, the following will briefly introduce the drawings that need to be used in the description of embodiments or the prior art. Obviously, the drawings in the following description are merely examples. For those of ordinary skill in the art, without creative work, other drawings can be obtained from these drawings.

DETAILED DESCRIPTION OF THE EMBODIMENTS

In order to make the objectives, technical solutions, and advantages of the present disclosure clearer, the present disclosure will be further described in detail below in conjunction with specific embodiments and with reference to the accompanying drawings.

It should be noted that, unless otherwise defined, the technical terms or scientific terms used in the present disclosure shall have the usual meanings understood by those with ordinary skills in the field to which the present disclosure belongs. The "first", "second", and similar words used in the present disclosure do not indicate any order, quantity, or importance, but are only used to distinguish different components. "Comprise" or "include" and other similar words mean that the element or item appearing before the word covers the element or item listed after the word and their equivalents, but does not exclude other elements or items. Similar words such as "connected" or "connection" are not limited to physical or mechanical connections, but may include electrical connections, whether direct or indirect.

In cryptography, there is an important tool, which is the hash algorithm, sometimes called a digital fingerprint. It is like the abstract of an article, and is also called the digest algorithm. The rapid development in the Internet of Things (IoT) has rapidly exposed many problems in information security. This makes the international society, many countries, or enterprises to pay attention to security issues. The future security in the Internet of Things will be an integrated and diversified solution, with hash algorithms playing an important role in hardware security, software security, and application security.

There are many kinds of hash algorithms, such as the direct addressing method, the digital analysis method, the middle-square method, the division-remainder method, etc. Hash algorithms are widely used in file verification, digital signature generation, authentication protocol, secure startup, and fast addressing. The above applications are generally implemented by software and are mainly used to solve trust problems in communication.

However, in the use of software-implemented hash algorithms, once the software code is deciphered, security issues are likely to occur. In view of this, the present disclosure provides a hash algorithm circuit, a hash algorithm method, and an electronic device. The hash algorithm circuit uses a hardware structure to physically reduce the fixed-length parallel data. The reduced identifier can be used as an index reference, an identifier ID, an address extension bit, information summary, etc., and has a higher safety performance. The hash algorithm circuit has the characteristics of low power consumption, low cost, etc., and can be integrated in a digital circuit.

Figure 1:
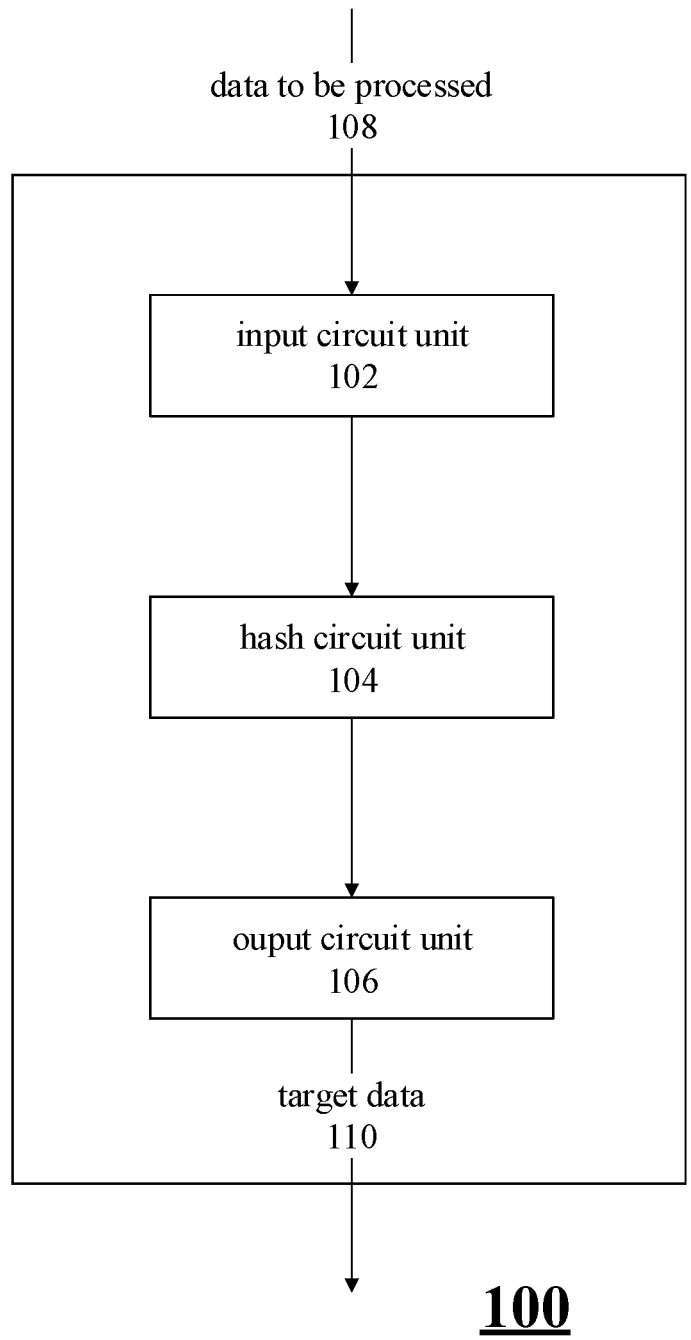
FIG. 1 shows an exemplary circuit structure diagram of a hash algorithm circuit according to an embodiment of the present disclosure.

FIG. 1 shows an exemplary circuit structure diagram of a hash algorithm circuit 100 according to an embodiment of the present disclosure.

The hash algorithm circuit 100 includes an input circuit unit 102, at least one hash circuit unit 104, and an output circuit unit 106.

As shown in FIG. 1, the input circuit unit 102 may receive data 108 to be processed from an external device (not shown). The external device can be another module of the electronic device to which the hash algorithm circuit 100 belongs (for example, the processor of the electronic device to which the hash algorithm circuit 100 belongs). Alternatively, the external device can be another terminal device other than the electronic device to which the hash algorithm circuit 100 belongs. The data 108 to be processed can be a message of any length. The data 108 to be processed may be, for example, a secret key index address, device identity information, and so on.

The hash circuit unit 104 is electrically coupled to the input circuit unit 102. The hash circuit unit 104 has a circuit structure arranged according to a preset hash algorithm. For example, after the data 108 to be processed passes through the hash circuit unit 104, it is formed into a target data 110. Since the hash circuit unit 104 has a circuit structure arranged according to a preset hash algorithm, the target data 110 formed after the data 108 to be processed passes through the hash circuit unit 104 has a data length smaller than the data length of the data 108 to be processed. In this way, when processing or storing the target data 110, compared with the data 108 to be processed, resource consumption can be reduced, and the processing speed can be increased. In addition, since the hash circuit unit 104 has a circuit structure arranged according to a preset hash algorithm, it is difficult for the target data 110 formed after passing through the hash circuit unit 104 to be reversely deciphered such that the data 108 to be processed is obtained.

In some embodiments, the preset hash algorithm may be selected from at least one of the following methods: direct addressing method, digital analysis method, middle-square method, folding method, random number method, and division-remainder method.

In the direct addressing method, a keyword or a linear function value of a keyword is taken as a hash address. That is, H(key)=key or H(key)=a·key+b, where a and b are constants. This kind of hash function can also be called a self function.

In the digital analysis method, a set of data is analyzed to finds out the laws of numbers, and these data are used as much as possible to construct a hash address with a lower probability of conflict. For example, if the first few digits of the birth year, month, and day of a group of employees are found to be roughly the same, there will be a high probability of conflict. However, if the last few digits of the year, month, and day are found to indicate a quite different month and date, the probability of conflicts will be significantly reduced when the last few digits are used to form a hash address.

In the middle-square method, the middle bits after a square operation of the keyword are taken as the hash address.

In the folding method, the keyword is divided into several parts having the same number of bits, wherein the last part of the number of bits can be different, and then a superposition (and a carry-bit removal) of these parts is taken as the hash address.

In the random number method, a random function is selected, and the keyword is taken as the seed of the random function, so as to generate a random value as a hash address, which is usually used in situations where the length of the keyword is different.

In the division-remainder method, the remainder, obtained by dividing the keyword by a number p that is not greater than the length m of the hash table, is taken as the hash address. That is, H(key)=key MOD p, p≤m. This enables not only a direct modulus of the keyword, but also a modulus after the folding and middle-square operations. The choice of p is very important, which is usually a prime number or m. If p is not well chosen, collisions are likely to occur.

Figure 2:
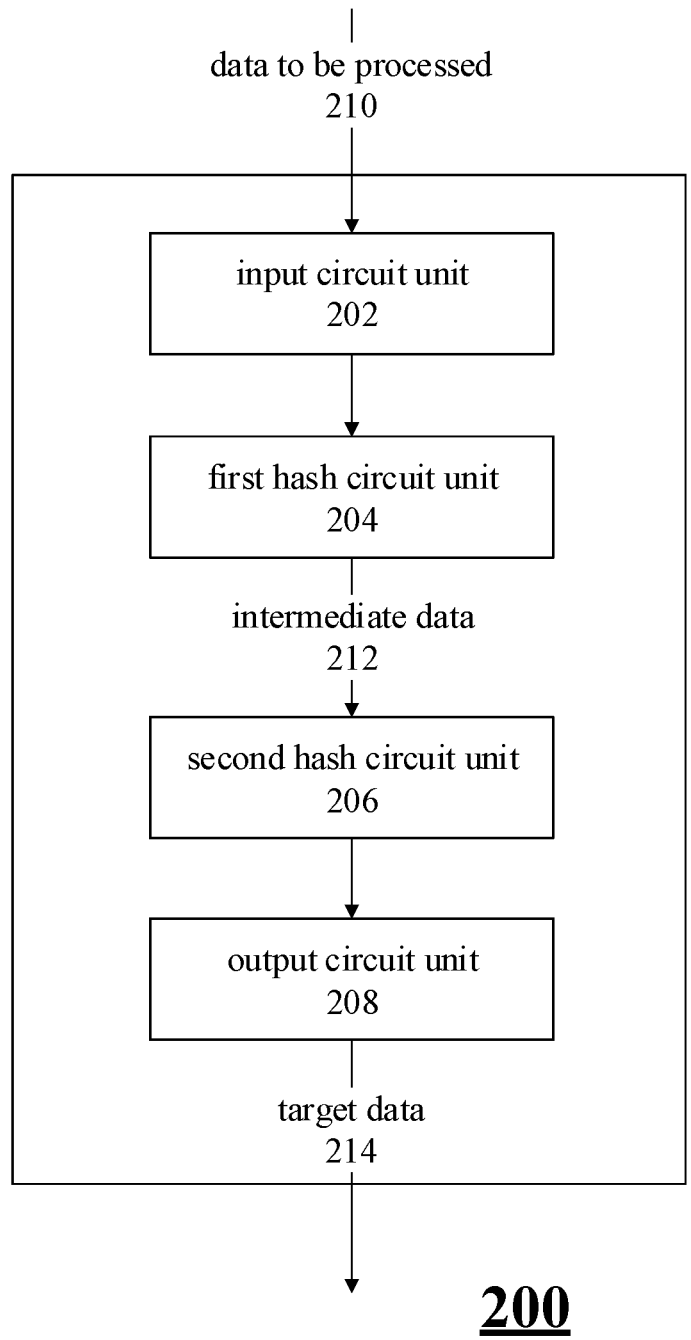
FIG. 2 shows an exemplary structure diagram of a hash algorithm circuit according to an embodiment of the present disclosure.

In some embodiments, the number of the hash circuit units may be two or more. FIG. 2 shows an exemplary structural diagram of a hash algorithm circuit 200 according to an embodiment of the present disclosure.

The hash algorithm circuit 200 includes an input circuit unit 202, a first hash circuit unit 204, a second hash circuit unit 206, and an output circuit unit 208.

The first hash circuit unit 204 is electrically coupled to the input circuit unit 202. In some embodiments, the first hash circuit unit 204 may have a circuit structure arranged according to a first preset hash algorithm, and is used to form the data 210 to be processed into the intermediate data 212. In some embodiments, the first preset hash algorithm may be selected from at least one of the following methods: direct addressing method, digital analysis method, middle-square method, folding method, random number method, and division-remainder method.

Since the first hash circuit unit 204 has a circuit structure arranged according to the first preset hash algorithm, the data length of the intermediate data 212, which is formed from the data 210 to be processed after passing through the first hash circuit unit 204, will be smaller than that of the data 210 to be processed. Since the first hash circuit unit 204 has a circuit structure arranged in accordance with the first preset hash algorithm, the intermediate data 212, which is formed after passing through the first hash circuit unit 204, increases the difficulty for reverse deciphering of the data 210 to be processed.

The second hash circuit unit 206 is electrically coupled to the first hash circuit unit 206 and the output circuit unit 208, respectively. In some embodiments, the second hash circuit unit 206 may have a circuit structure arranged according to a second preset hash algorithm, and is used to form the intermediate data 212 into the target data 214. In some embodiments, the second preset hash algorithm can be selected from at least one of the following methods: direct addressing method, digital analysis method, middle-square method, folding method, random number method, and division-remainder method.

Since the second hash circuit unit 206 has a circuit structure arranged according to the second preset hash algorithm, the target data 214, which is formed of the intermediate data 212 after passing through the second hash circuit unit 206, has a data length smaller than that of the intermediate data 212. In this way, when processing or storing the target data 214, compared with the data to be processed 210, resource consumption can be reduced, and the processing speed can be increased. In addition, because the intermediate data 212 is the data obtained after processing by the first hash circuit unit 204 of the data 210 to be processed, and at the same time, the second hash circuit unit 206 has a circuit structure arranged in accordance with the second preset hash algorithm, the target data 214 formed of the intermediate data 212 after passing through the second hash circuit unit 206 further increases the difficulty to reverse decipher for obtaining the data 210 to be processed.

In some embodiments, the first hash circuit unit includes at least one of an exclusive OR circuit, a summation circuit, and a shift circuit, and the second hash circuit unit includes at least one of an exclusive OR circuit, a summation circuit, and a shift circuit.

The exclusive OR circuit obtains a new data sequence by performing exclusive OR operation on two data sequences, thereby shortening the two data sequences into one data sequence.

The summation circuit obtains a new data sequence by summing up the two data sequences, thereby shortening the two data sequences into one data sequence.

The shift circuit performs shift processing on part of the data sequence in the complete data, so that positions of some data sequences in the complete data are disrupted, thereby increasing the difficulty for deciphering the data.

Figure 3:
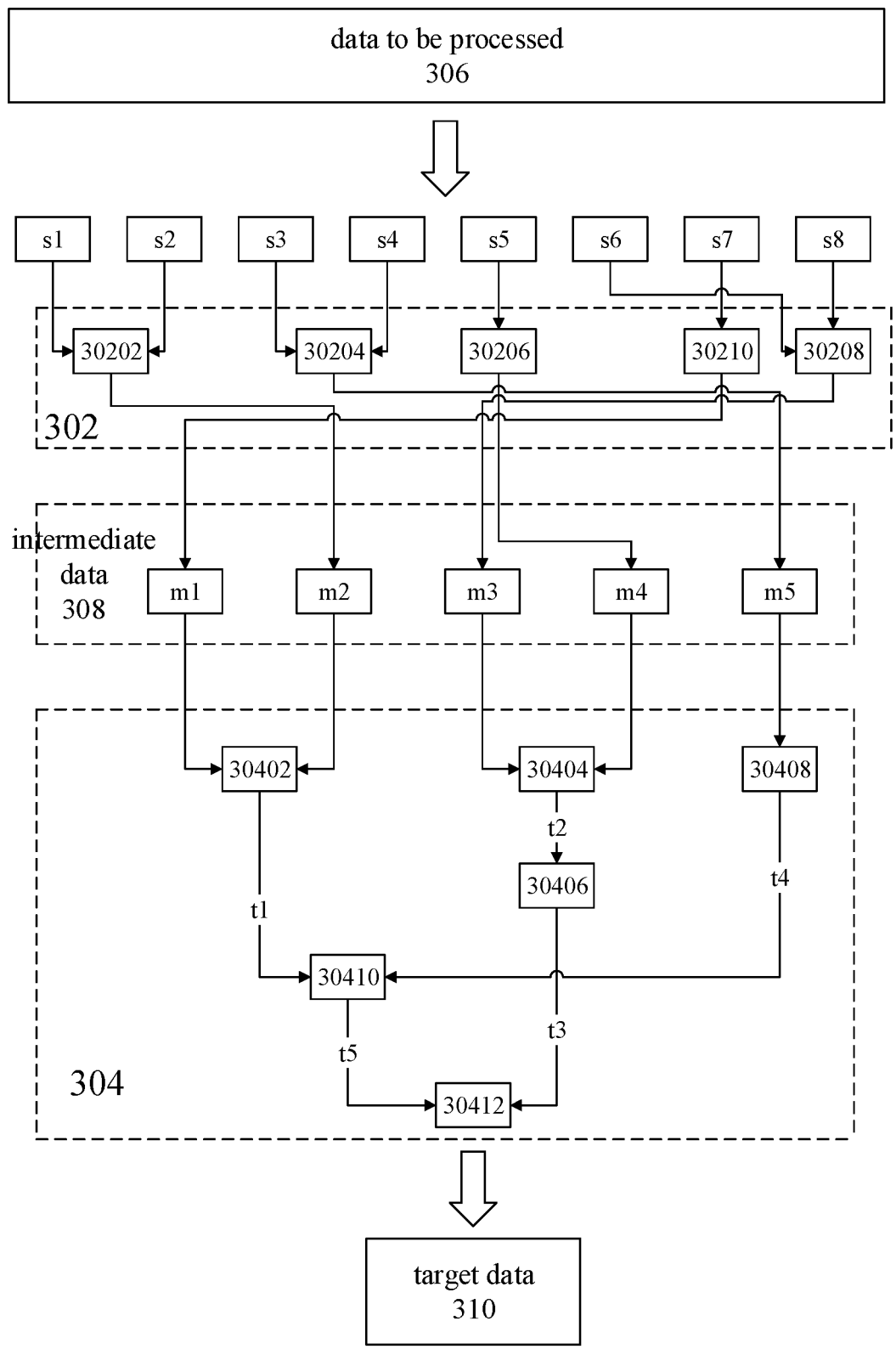
FIG. 3 shows a schematic circuit structure diagram of a group of hash circuit units according to an embodiment of the present disclosure.

FIG. 3 shows a schematic circuit structure diagram of a group 300 of hash circuit units according to an embodiment of the present disclosure.

The data 306 to be processed, input to the group 300 of hash circuit units, can be divided into several sequences first. For example, the data length of the data 306 to be processed is n×L, and the data 306 to be processed can be divided into n sequences, and each sequence has a length of L. In the example shown in FIG. 3, the data 306 to be processed is divided into 8 sequences s1 to s8, that is, n=8, and the length of each sequence is L.

In some embodiments, the step of dividing the data 306 to be processed may be completed by other modules of the electronic device to which the hash algorithm circuit 100 belongs (for example, the processor of the electronic device to which the hash algorithm circuit 100 belongs). Then, the result passes through the input circuit unit (not shown in FIG. 3) and is input to the group 300 of hash circuit units.

As shown in FIG. 3, the first hash circuit unit 302 includes a first exclusive OR circuit 30202, a first summation circuit 30204, a first left shift circuit 30206, a second exclusive OR circuit 30208, and a first right shift circuit 30210.

The first exclusive OR circuit 30202 is configured to perform an exclusive OR operation on the first sequence s1 and the second sequence s2 of the data 306 to be processed, and the second intermediate sequence m2 (having a length of L) of the intermediate data 308 can be obtained by position replacement.

The first summation circuit 30204 is configured to perform a summation operation on the third sequence s3 and the fourth sequence s4 of the data 306 to be processed, and the fifth intermediate sequence m5 (having a length of L) of the intermediate data 308 can be obtained by position replacement.

The first left shift circuit 30206 is configured to shift the fifth sequence s5 of the data 306 to be processed to the left (for example, shift to the left by 3 bits), and the fourth intermediate sequence m4 (having a length of L) of the intermediate data 308 can be obtained by position replacement.

The second exclusive OR circuit 30208 is configured to perform an exclusive OR operation on the sixth sequence s6 and the eighth sequence s8 of the data 306 to be processed, and the third intermediate sequence m3 (having a length of L) of the intermediate data 308 can be obtained by position replacement.

The first right shift circuit 30210 is configured to shift the seventh sequence s7 of the data 306 to be processed to the right (for example, shift to the right by 3 bits), and the first intermediate sequence m1 (having a length of L) of the intermediate data 308 can be obtained by position replacement.

It can be seen that the intermediate data 308 includes intermediate sequences m1-m5, and the data length of each intermediate sequence is equal to the data length of the initial sequence s1-s8. Therefore, the intermediate data 308, which is obtained after passing through the first hash circuit unit 302 and is shorter than the data 306 to be processed, undergoes exclusive OR, summation, and shift operations, which increases the difficulty for reverse deciphering the intermediate data 308.

Further, the intermediate data 308 may be processed by the second hash circuit unit 304 to obtain the target data 310.

The second hash circuit unit 304 includes a third exclusive OR circuit 30402, a second summation circuit 30404, a second right shift circuit 30406, a second left shift circuit 30408, a fourth exclusive OR circuit 30410, and a fifth exclusive OR circuit 30412.

The third exclusive OR circuit 30402 is electrically coupled to the first right shift circuit 30210 and the first exclusive OR circuit 30202 respectively, and is configured to perform an exclusive OR operation on the first intermediate sequence m1 and the second intermediate sequence m2, so as to form a first temporary sequence t1 having a length of L.

The second summation circuit 30404 is electrically coupled to the second exclusive OR circuit 30208 and the first left shift circuit 30206 respectively, and is configured to sum up the third intermediate sequence m3 and the fourth intermediate sequence m4, so as to form a second temporary sequence t2 having a length of L.

The second right shift circuit 30406 is electrically coupled to the second summation circuit 30404, and is configured to shift the second temporary sequence t2 to the right by a first predetermined number of bits (for example, shift to the right by 5 bits), so as to form the third temporary sequence t3 having a length of L.

The second left shift circuit 30408 is electrically coupled to the first summation circuit 30204 and is configured to shift the fifth intermediate sequence m5 to the left by a second predetermined number of bits (for example, shift to the left by 7 bits), so as to form the fourth temporary sequence t4 having a length of L.

The fourth exclusive OR circuit 30410 is electrically coupled to the third exclusive OR circuit 30402 and the second left shift circuit 30406 respectively, and is configured to perform an exclusive OR operation on the first temporary sequence t1 and the fourth temporary sequence t4, so as to form a fifth temporary sequence t5 having a length of L.

The fifth exclusive OR circuit 30412 is electrically coupled to the fourth exclusive OR circuit 30410 and the second right shift circuit 30406 respectively, and is configured to perform an exclusive OR operation on the third temporary sequence t3 and the fifth temporary sequence t5, so as to form the target data 310 having the length of L.

After passing through the first hash circuit unit 302 and the second hash circuit unit 304, the data 306 to be processed is reduced from the length n×L to the length L of the target data 310. The mathematical relationship is described as follows:

$$m1 = s7 \gg 3$$
$$m2 = s1 \oplus s2$$
$$m3 = s6 \oplus s8$$
$$m4 = s5 \ll 3$$
$$m5 = (s3 + s4) \bmod 2^L$$
$$d = [(m_1 \oplus m_2) \oplus (m_5 \ll 7)] \oplus \{[(m_3 + m_4) \bmod 2^L] \gg 5\}$$

It can be seen that the group 300 of hash circuit units finally completes the following mapping:

$$H(s) = d$$
$$S = \{s1, s2, s3, \ldots, sn\}$$

wherein, d is the final target data 310 having the length of L, S is the data 306 to be processed having the length of n×L, and the length of S is n times that of d, where s1-sn are the sequences obtained by segmenting S, and each sequence has a length of L, which is consistent with the length of d.

It can be seen that the target data 310 includes only one sequence, and the data length of this sequence is equal to the data length of the initial sequence s1-s8. Therefore, after a further processing by the second hash circuit unit 304, the target data is further shortened, and the intermediate data 308 undergoes exclusive OR, summation, and shift processing, which further increases the difficulty for reverse deciphering the target data 310.

It can be seen from the above embodiment that after processing by the exclusive OR circuit or the summation circuit, the two sequences can be combined into one sequence. That is, the data length is shortened by the length of one sequence. Therefore, according to actual needs, the number of exclusive OR circuits, summation circuits, or circuits with similar functions included in the hash circuit unit can be designed, such that the data to be processed is formed into a target data of a desired length.

For example, in the foregoing embodiment, the data to be processed having a length of 8×L is formed into a target data having a length of L, wherein the total number of exclusive OR circuits and summation circuits used is 7. In other words, if the length of the data to be processed is n×L, then a total number of n−1 exclusive OR circuits and summation circuits (or circuits with similar functions) need to be set up if the target data length of L is desired. It can be seen that the number of exclusive OR circuits and summation circuits needs to be determined according to the difference between the number of sequences n in the data to be processed and the number of sequences u in the target data. In addition, when distributing the number of exclusive OR circuits and summation circuits in different hash circuit units, the number of exclusive OR circuits and summation circuits in each hash circuit unit can also be determined according to the number k of sequences in the intermediate data.

It should be noted that the group 300 of hash circuit unit is only an exemplary structure. It can be known that the number of hash circuit units included in the hash algorithm circuit can be selected according to the complexity in circuit design. In addition, the specific circuits used in the hash circuit unit are not limited to exclusive OR circuits, summation circuits, and shift circuits, and other circuits can also be selected according to actual needs.

The output circuit unit 106 is electrically coupled to the hash circuit unit 104, and is configured to output the target data 110 to an external device (not shown). The external device can be another module of the electronic device to which the hash algorithm circuit 100 belongs (for example, the processor of the electronic device to which the hash algorithm circuit 100 belongs). Alternatively, the external device can be another terminal device other than the electronic device to which the hash algorithm circuit 100 belongs.

The hash algorithm circuit proposed in the present disclosure can be used to shorten a fixed-length parallel data, so as to generate new index addresses or identifiers. The hash algorithm circuit can increase the flexibility and complexity of security circuits such as the random number generator or the physical non-clone function, for preventing hackers from directly accessing the core modules to carry out modeling attacks.

For example, if the original input is a certain index address, the original input address can used by the hash algorithm circuit to generate a new index address. Since the hash algorithm circuit is a hardware structure, the specific circuit structure cannot be obtained through software deciphering. Therefore, even if the original input address is deciphered, the information (such as the key) corresponding to the actual index address (new index address) cannot be obtained, and the security of the device is provided through the hash algorithm circuit.

At the same time, the hash algorithm circuit proposed in the present disclosure has the characteristics of small occupied area, low power consumption, low cost, etc., and is easy to be integrated in a digital circuit.

The hash algorithm circuit can be used as an address expansion. If an address is IDX, it will be reduced to IDX/n after passing through the circuit, and a new address can be formed as:

$$IDX_{new} = \{IDX, H(IDX)\}$$

After the above expansion, the address bits are expanded, and thus this circuit can be used in instruction set compression or physical address mapping. At the same time, for example, if an address is IDX, it is reduced to IDX/n after being hashed. After shifting to the left by L bits, it passes through the hash algorithm circuit again, and is reduced to IDX/n. That is, the same address can be used to generate multiple addresses. In addition, there are many applications.

Figure 4:
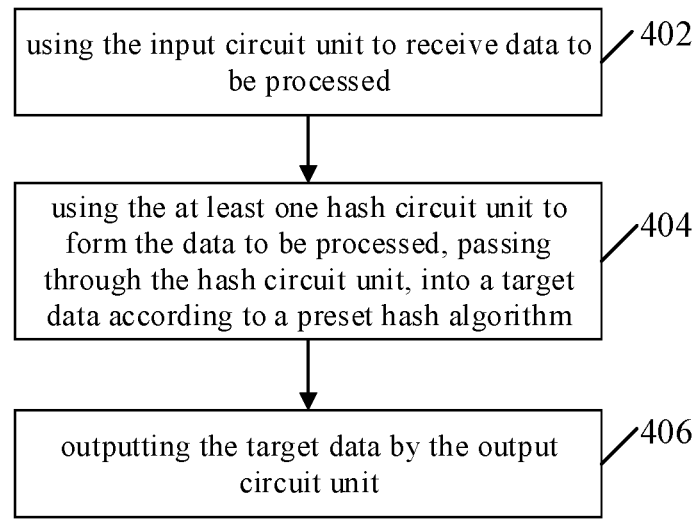
FIG. 4 shows a schematic flowchart of an exemplary method according to an embodiment of the present disclosure.

FIG. 4 shows a schematic flowchart of an exemplary method 400 according to an embodiment of the present disclosure.

The hash algorithm method 400 can be implemented using a hash algorithm circuit. In some embodiments, referring to FIG. 1, the hash algorithm circuit 100 includes an input circuit unit 102, at least one hash circuit unit 104 and an output circuit unit 106 which are electrically coupled in sequence. The hash algorithm method 400 includes the following steps.

In step 402, the input circuit unit (for example, the input circuit unit 102 in FIG. 1) is used to receive the data to be processed (for example, the data 108 to be processed in FIG. 1).

In step 404, the at least one hash circuit unit (for example, the hash circuit unit 104 in FIG. 1) is used to form the data to be processed, passing through the hash circuit unit, into target data (for example, the target data 110 in FIG. 1) according to a preset hash algorithm, wherein the data length of the data to be processed is greater than the data length of the target data.

In some embodiments, the preset hash algorithm is selected from at least one of the following methods: direct addressing method, digital analysis method, middle-square method, folding method, random number method, and division-remainder method.

In some embodiments, the hash algorithm circuit includes a first hash circuit unit (for example, the first hash circuit unit 204 of FIG. 2) electrically coupled to the input circuit unit and a second hash circuit unit (for example, the second hash circuit unit 206 of FIG. 2) electrically coupled to the first hash circuit unit. The hash algorithm method further includes the following steps.

The first hash circuit unit is used to form the data to be processed into an intermediate data (for example, the intermediate data 212 in FIG. 2) according to a first preset hash algorithm, wherein the data length of the data to be processed is greater than the data length of the intermediate data.

The second hash circuit unit is used to form the intermediate data into the target data (for example, the target data 214 in FIG. 2) according to a second preset hash algorithm, wherein the data length of the intermediate data is greater than the data length of the target data.

In some embodiments, the first hash circuit unit includes at least one of an exclusive OR circuit, a summation circuit, and a shift circuit, and the second hash circuit unit includes at least one of an exclusive OR circuit, a summation circuit, and a shift circuit.

In some embodiments, the data to be processed is divided into 8 sequences. The first hash circuit unit (for example, the first hash circuit unit 302 in FIG. 3) includes a first exclusive OR circuit (for example, the first exclusive OR circuit 30202 of FIG. 3), a first summation circuit (for example, the first summation circuit 30204 of FIG. 3), a first left shift circuit (for example, the first left shift circuit 30206 of FIG. 3), a second exclusive OR circuit (for example, the second exclusive OR circuit 30208 of FIG. 3), and a first right shift circuit (for example, the first right shift circuit 30210 of FIG. 3).

The hash algorithm method also includes:
using the first exclusive OR circuit to perform an exclusive OR operation on the first sequence (for example, the first sequence t1 in FIG. 3) and the second sequence (for example, the second sequence t2 in FIG. 3) of the data to be processed (for example, the data 306 to be processed in FIG. 3), so as to form a second intermediate sequence (for example, the second intermediate sequence m2 in FIG. 3) of the intermediate data (for example, the intermediate data 308 in FIG. 3);
using the first summation circuit to perform a summation operation on the third sequence (for example, the third sequence t3 of FIG. 3) and the fourth sequence (for example, the fourth sequence t4 of FIG. 3) of the data to be processed, so as to form the fifth intermediate sequence (for example, the fifth intermediate sequence m5 in FIG. 3) of the intermediate data;
using the first left shift circuit to shift the fifth sequence (for example, the fifth sequence t5 in FIG. 3) of the data to be processed to the left, so as to form the fourth intermediate sequence (for example, the fourth intermediate sequence m4 of FIG. 3) of the intermediate data;
using the second exclusive OR circuit to perform an exclusive OR operation on the sixth sequence (for example, the sixth sequence t6 in FIG. 3) and the eighth sequence (for example, the eighth sequence t8 in FIG. 3) of the data to be processed, so as to form the third intermediate sequence (for example, the third intermediate sequence m3 in FIG. 3) of the intermediate data; and
using the first right shift circuit to shift the seventh sequence (for example, the seventh sequence t7 in FIG. 3) of the data to be processed to the right, so as to form the first intermediate sequence (for example, the first intermediate sequence m1 of FIG. 3) of the intermediate data.

In some embodiments, the second hash circuit unit (for example, the second hash circuit unit 304 in FIG. 3) includes a third exclusive OR circuit (for example, the third exclusive OR circuit 30402 in FIG. 3), a second summation circuit (for example, the second summation circuit 30404 of FIG. 3), a second right shift circuit (for example, the second right shift circuit 30406 of FIG. 3), a second left shift circuit (for example, the second left shift circuit 30408 of FIG. 3), a fourth exclusive OR circuit (for example, the fourth exclusive OR circuit 30410 of FIG. 3), and a fifth exclusive OR circuit (for example, the fifth exclusive OR circuit 30412 of FIG. 3). The third exclusive OR circuit is electrically coupled to the first right shift circuit and the first exclusive OR circuit, respectively. The second summation circuit is electrically coupled to the second exclusive OR circuit and the first left shift circuit respectively. The second right shift circuit is electrically coupled to the second summation circuit. The second left shift circuit is electrically coupled to the first summation circuit. The fourth exclusive OR circuit is electrically coupled to the third exclusive OR circuit and the second left shift circuit respectively. The fifth exclusive OR circuit is electrically coupled to the fourth exclusive OR circuit and the second right shift circuit respectively.

The hash algorithm method also includes:
using the third exclusive OR circuit to perform an exclusive OR operation on the first intermediate sequence and the second intermediate sequence, so as to form a first temporary sequence (for example, the first temporary sequence t1 in FIG. 3); using the second summation circuit to perform a summation operation on the third intermediate sequence and the fourth intermediate sequence, so as to form a second temporary sequence (for example, the second temporary sequence t2 in FIG. 3);
using the second right shift circuit to shift the second temporary sequence to the right by a first predetermined number of bits, so as to form a third temporary sequence (for example, the third temporary sequence t3 in FIG. 3);
using the second left shift circuit to shift the fifth intermediate sequence to the left by a second predetermined number of bits, so as to form a fourth temporary sequence (for example, the fourth temporary sequence t4 in FIG. 3);
using the fourth exclusive OR circuit to perform an exclusive OR operation on the first temporary sequence and the fourth temporary sequence, so as to form a fifth temporary sequence (for example, the fifth temporary sequence t5 in FIG. 3); and
using the fifth exclusive OR circuit to perform an exclusive OR operation on the third temporary sequence and the fifth temporary sequence, so as to form the target data (for example, the target data 310 of FIG. 3).

In step 406, the output circuit unit (for example, the output circuit unit 106 of FIG. 1) is used to output the target data.

The hash algorithm method implemented by the hash algorithm circuit provided by the present disclosure is used to reduce the fixed-length parallel data, and the reduced identifier can be used as an index reference, an identifier ID, an address extension bit, information summary, and so on.

It should be noted that the specific embodiments of the present disclosure are described above. Other embodiments are within the scope of the appended claims. In some cases, the actions or steps described in the claims can be performed in a different order than that in the embodiments, and still the desired results can be achieved. In addition, the processes depicted in the drawings do not necessarily require the specific order or sequential order shown, in order to achieve the desired results. In some embodiments, multitasking and parallel processing are also possible or may be advantageous.

Based on the same inventive concept and corresponding to any of the above-mentioned method embodiments, the present disclosure also provides an electronic device, including a memory, a processor, and a computer program stored in the memory and running on the processor. The processor, when executing the program, implements the hash algorithm method described in any of the above embodiments.

Figure 5:
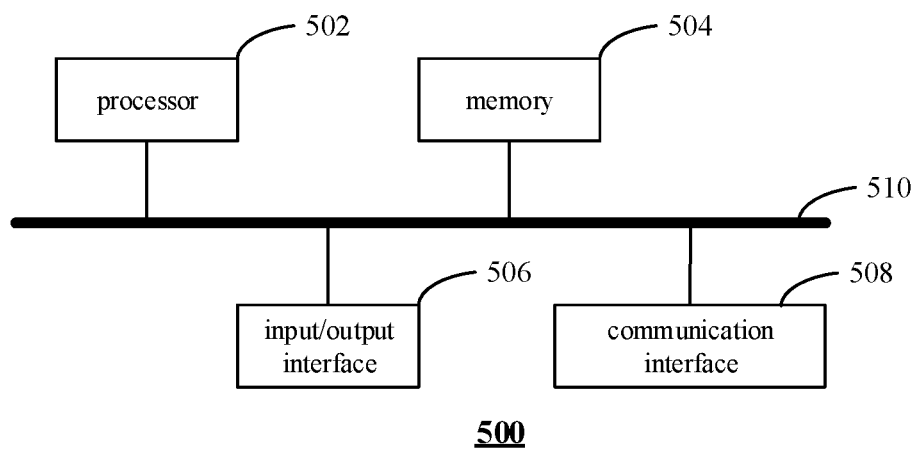
FIG. 5 shows a more specific schematic diagram of a hardware structure of an electronic device 500 provided by an embodiment of the present disclosure.

FIG. 5 shows a more specific schematic diagram of the hardware structure of the electronic device 500 provided by an embodiment of the present disclosure. The device 500 may include a processor 502, a memory 504, an input/output interface 506, a communication interface 508, and a bus 510. The processor 502, the memory 504, the input/output interface 506, and the communication interface 508 realize communication connections between each other in the device through the bus 510.

The processor 502 can be implemented by a general Central Processing Unit (CPU), a microprocessor, an Application Specific Integrated Circuit (ASIC), or one or more integrated circuits, etc., for executing related programs, so as to implement the technical solutions provided by embodiments of the present disclosure.

The memory 504 may be implemented in the form of Read Only Memory (ROM), Random Access Memory (RAM), static storage device, dynamic storage device, etc. The memory 504 may store an operating system and other application programs. When the technical solutions provided by embodiments of the present disclosure are implemented through software or firmware, related program codes are stored in the memory 504, and called and executed by the processor 502.

The input/output interface 506 is used to connect an input/output module to realize input and output of information. The input/output module can be configured in the device as a component (not shown in the figure), or connected to the device to provide corresponding functions. The input device may include a keyboard, a mouse, a touch screen, a microphone, various sensors, etc., and the output device may include a display, a speaker, a vibrator, an indicator light, and the like.

In some embodiments, the input/output interface 506 may be also electrically coupled with the hash algorithm circuit (for example, the hash algorithm circuit 100 in FIG. 1, the hash algorithm circuit 200 in FIG. 2, or the hash algorithm circuit 300 in FIG. 3), and uses the hash algorithm circuit to process the input or output data before subsequent operations.

The communication interface 508 is used to connect a communication module (not shown in the figure) to implement communication interaction between the device and other devices. The communication module can realize communication through wired means (such as USB, network cable, etc.), or through wireless means (such as mobile network, WIFI, Bluetooth, etc.).

The bus 510 includes a path to transmit information between various components (for example, the processor 502, the memory 504, the input/output interface 506, and the communication interface 508) of the device.

It should be noted that although the above device only shows the processor 502, the memory 504, the input/output interface 506, the communication interface 508, and the bus 510, in specific implementations, the device may also include other components necessary for normal operation. In addition, those skilled in the art can understand that the above-mentioned device may also include only the components necessary to implement the technical solutions according to embodiments of the present disclosure, and not necessarily include all the components shown in the figures.

The electronic device according to the foregoing embodiment is used to implement the corresponding hash algorithm method in any of the foregoing embodiments, and has the beneficial effects of the corresponding method embodiments, which will not be repeated here.

Those of ordinary skill in the art should understand that the discussion of any of the above embodiments is only exemplary, and is not intended to imply that the scope of the present disclosure (including the claims) is limited to these examples. Under the idea of the present disclosure, the technical features in the above embodiments or in different embodiments can also be combined, the steps can be implemented in any order, and there are many other changes in different aspects of the present disclosure as described above, which are not provided in details for the sake of brevity.

In addition, in order to simplify the description and discussion, and in order not to obscure the present disclosure, the well-known power source/ground connection of the integrated circuit (IC) chips and other components may or may not be shown in the provided drawings. In addition, the devices may be shown in the form of block diagrams, in order to avoid making the present disclosure difficult to understand. This also takes into account the following fact that the details of the implementation of these block diagram devices are highly dependent on the platform on which the present disclosure will be implemented (i.e., these details should be fully within the understanding of those skilled in the art). In a case where specific details (for example, circuits) are described to illustrate exemplary embodiments of the present disclosure, it is obvious to those skilled in the art that it is also possible to implement the present disclosure without these specific details or when these specific details are changed. Therefore, these descriptions should be considered illustrative rather than restrictive.

Although the present disclosure has been described in conjunction with specific embodiments of the present disclosure, based on the foregoing description, many substitutions, modifications, and variations of these embodiments will be apparent to those of ordinary skill in the art. For example, other memory architectures (e.g., dynamic RAM (DRAM)) can be used in the discussed embodiments.

The present disclosure is intended to cover all such substitutions, modifications and variations that fall within the broad scope of the appended claims. Therefore, any omissions, modifications, equivalent substitutions, improvements, etc. made within the spirit and principle of the present disclosure should be included in the protection scope of the present disclosure.

Therefor, the following is claimed:

1. A hash algorithm circuit, comprising:
    an input circuit unit, configured to receive data to be processed;
    at least one hash circuit unit, electrically coupled to the input circuit unit, wherein the hash circuit unit has a circuit structure arranged according to a preset hash algorithm, and is configured to form the data to be processed, passing through the hash circuit unit, into a target data, wherein a data length of the data to be processed is greater than a data length of the target data;
    an output circuit unit, electrically coupled to the at least one hash circuit units, and is configured to output the target data; and
    a first hash circuit unit and a second hash circuit unit, wherein:
    the first hash circuit unit is electrically coupled to the input circuit unit, and the first hash circuit unit has a circuit structure arranged according to a first preset hash algorithm, and is configured to form the data to be processed into an intermediate data, wherein the data length of the data to be processed is greater than a data length of the intermediate data;
    the second hash circuit unit is electrically coupled to the first hash circuit unit, and the second hash circuit unit has a circuit structure arranged according to a second preset hash algorithm, and is configured to form the intermediate data into the target data, wherein a data length of the intermediate data is greater than the data length of the target data;
    the data to be processed is divided into n sequences;
    the first hash circuit unit is configured to form, through its circuit structure, the n sequences into the intermediate data having k sequences according to the first preset hash algorithm, where n and k are both natural number, and n>k; and
    the second hash circuit unit is configured to form, through its circuit structure, the k sequences into the target data having u sequences according to the second preset hash algorithm, where u is a natural number, and k>u.

2. The hash algorithm circuit according to claim 1, wherein the preset hash algorithm is selected from at least one of the following methods: direct addressing method, digital analysis method, middle-square method, folding method, random number method, and division-remainder method.

3. The hash algorithm circuit according to claim 1, wherein:
the first hash circuit unit comprises at least one of an exclusive OR circuit, a summation circuit, and a shift circuit; and
the second hash circuit unit comprises at least one of an exclusive OR circuit, a summation circuit, and a shift circuit, wherein
when at least one of the first hash circuit unit and the second hash circuit unit comprises the exclusive OR circuit, the number of the exclusive OR circuit is determined according to a difference between n and u; and
when at least one of the first hash circuit unit and the second hash circuit unit comprises the summation circuit, the number of the summation circuit is determined according to a difference between n and u.

4. The hash algorithm circuit according to claim 3, wherein the data to be processed is divided into 8 sequences, and the first hash circuit unit comprises:
a first exclusive OR circuit, configured to perform an exclusive OR operation on a first sequence and a second sequence of the data to be processed, so as to form a second intermediate sequence of the intermediate data;
a first summation circuit, configured to perform a summation operation on a third sequence and a fourth sequence of the data to be processed, so as to form a fifth intermediate sequence of the intermediate data;
a first left shift circuit, configured to shift a fifth sequence of the data to be processed to the left, so as to form a fourth intermediate sequence of the intermediate data;
a second exclusive OR circuit, configured to perform an exclusive OR operation on a sixth sequence and an eighth sequence of the data to be processed, so as to form a third intermediate sequence of the intermediate data; and
a first right shift circuit, configured to shift a seventh sequence of the data to be processed to the right, so as to form a first intermediate sequence of the intermediate data.

5. The hash algorithm circuit according to claim 4, wherein the second hash circuit unit comprises:
a third exclusive OR circuit, electrically coupled to the first right shift circuit and the first exclusive OR circuit respectively, and configured to perform an exclusive OR operation on the first intermediate sequence and the second intermediate sequence, so as to form a first temporary sequence;
a second summation circuit, electrically coupled to the second exclusive OR circuit and the first left shift circuit, and configured to perform a summation operation on the third intermediate sequence and the fourth intermediate sequence, so as to form a second temporary sequence;
a second right shift circuit, electrically coupled to the second summation circuit, and configured to shift the second temporal sequence to the right by a first predetermined number of bits, so as to form a third temporary sequence;
a second left shift circuit, electrically coupled to the first summation circuit, and configured to shift the fifth intermediate sequence to the left by a second predetermined number of bits, so as to form a fourth temporary sequence;
a fourth exclusive OR circuit, electrically coupled to the third exclusive OR circuit and the second left shift circuit respectively, and configured to perform an exclusive OR operation on the first temporary sequence and the fourth temporary sequence, so as to form a fifth temporary sequence; and
a fifth exclusive OR circuit, electrically coupled to the fourth exclusive OR circuit and the second right shift circuit respectively, and configured to perform an exclusive OR operation on the third temporary sequence and the fifth temporary sequence, so as to form the target data.

6. A hash algorithm method implemented by a hash algorithm circuit, comprising:
providing the hash algorithm circuit, wherein the hash algorithm circuit comprises an input circuit unit, at least one hash circuit unit, acid an output circuit unit electrically coupled in sequence;
using the input circuit unit o receive data to be processed;
using the at least one hash circuit unit to form the data to be processed, passing through the hash circuit unit, into a target data according to a preset hash algorithm, wherein a data length of the data to be processed is greater than a data length of the target data; and
outputting the target data by the output circuit unit, wherein
the hash algorithm circuit comprises a first hash circuit unit electrically coupled to the input circuit unit and a second hash circuit unit electrically connected to the first hash circuit unit;
the hash algorithm method further comprises:
using the first hash circuit unit to form the data to be processed into an intermediate data according to a first preset hash algorithm, the data length of the data to be processed is greater than a data length of the intermediate data, and
using the second hash circuit unit to form the intermediate data into the target data according to a second preset hash algorithm, wherein the data length of the intermediate data is greater than the data length of the target data;
wherein
the data to be processed is divided into n sequences, and the hash algorithm method further comprises:
using the first hash circuit unit to form, through its circuit structure, the n sequences into the intermediate data having k sequences according to the first preset hash algorithm, where n and k are both natural numbers, and n>k; and
using the second hash circuit unit to form, through its circuit structure, the k sequences into the target data having u sequences according to the second preset hash algorithm, where u is a natural number, and k>u.

7. The hash algorithm method according to claim 6, wherein the preset hash algorithm is selected from at least one of the following methods: direct addressing method, digital analysis method, middle-square method, folding method, random number method, and division-remainder method.

8. The hash algorithm method according to claim 6, wherein
the first hash circuit unit comprises at least one of an exclusive OR circuit, a summation circuit, and a shift circuit;

the second hash circuit unit comprises at least one of an exclusive OR circuit, a summation circuit, and a shift circuit; and the hash algorithm method further comprises:

determining the number of the exclusive OR circuit according to a difference between n and u when at least one of the first hash circuit unit and the second hash circuit unit comprises the exclusive OR circuit; and determining the number of the summation circuit according to a difference between n and u when at least one of the first hash circuit unit and the second hash circuit unit comprises the summation circuit.

9. The hash algorithm method according to claim 8, wherein:

the data to be processed is divided into 8 sequences;

the first hash circuit unit comprises a first exclusive OR circuit, a first summation circuit, a first left shift circuit, a second exclusive OR circuit, and a first right shift circuit; and the hash algorithm method also comprises:

using the first exclusive OR circuit to perform an exclusive OR operation on a first sequence and a second sequence of the data to be processed, so as to form a second intermediate sequence of the intermediate data;

using the first summation circuit to perform a summation operation on a third sequence and a fourth sequence of the data to be processed, so as to form a fifth intermediate sequence of the intermediate data;

using the first left shift circuit to shift a fifth sequence of the data to be processed to the left, so as to form a fourth intermediate sequence of the intermediate data;

using a second exclusive OR circuit to perform an exclusive OR operation on a sixth sequence and an eighth sequence of the data to be processed, so as to form a third intermediate sequence of the intermediate data; and using the first right shift circuit to shift a seventh sequence of the data to be processed to the right, so as to form a first intermediate sequence of the intermediate data.

10. The hash algorithm method according to claim 9, wherein the second hash circuit unit comprises a third exclusive OR circuit, a second summation circuit, a second right shift circuit, a second left shift circuit, a fourth exclusive OR circuit, and a fifth exclusive OR circuit, wherein the third exclusive OR circuit is electrically coupled to the first right shift circuit and the first exclusive OR circuit respectively, the second summation circuit is electrically coupled to the second exclusive OR circuit and the first left shift circuit respectively, the second right shift circuit is electrically coupled to the second summation circuit, the second left shift circuit is electrically coupled to the first summation circuit, the fourth exclusive OR circuit is electrically coupled to the third exclusive OR circuit and the second left shift circuit respectively, and the fifth exclusive OR circuit is electrically coupled to the fourth exclusive OR circuit and the second right shift circuit respectively; and the hash algorithm method also comprises:

using the third exclusive OR circuit to perform an exclusive OR operation on the first intermediate sequence and the second intermediate sequence, so as to form a first temporary sequence;

using the second summation circuit to perform a summation operation on the third intermediate sequence and the fourth intermediate sequence, so as to form a second temporary sequence;

using the second right shift circuit to shift the second temporary sequence to the right by a first predetermined number of bits, so as to form a third temporary sequence;

using the second left shift circuit to shift the fifth intermediate sequence to the left by a second predetermined number of bits, so as to form a fourth temporary sequence;

using the fourth exclusive OR circuit to perform an exclusive OR operation on the first temporary sequence and the fourth temporary sequence, so as to form a fifth temporary sequence; and using the fifth exclusive OR circuit to perform an exclusive OR operation on the third temporary sequence and the fifth temporary sequence, so as to form the target data.

11. An electronic device comprising a hash algorithm circuit, wherein the hash algorithm circuit comprises:

an input circuit unit, configured to receive data to be processed;

at least one hash circuit unit, electrically coupled to the input circuit unit, wherein the hash circuit nit has a circuit structure arranged according to a preset hash algorithm, and is configured to form the data to be processed, passing through the hash circuit unit, into a target data, wherein a data length of the data to be processed is greater than a data length of the target data;

an output circuit unit, electrically coupled to the at least one hash circuit units, and is configured to output the target data; and a first hash circuit unit and a second hash circuit unit, wherein:

the first hash circuit unit is electrically coupled to the input circuit unit, and the first hash circuit unit has a circuit structure arranged according to a first preset hash algorithm, and is configured to form the data to be processed into an intermediate data, wherein the data length of the data to be processed is greater than a data length of the intermediate data;

the second hash circuit unit is electrically coupled to the first hash circuit unit, and the second hash circuit unit has a circuit structure arranged according to a second preset hash algorithm, and is configured to form the intermediate data into the target data, wherein a data length of the intermediate data is greater than the data length of the target data;

the data to be processed is divided into n sequences;

the first hash circuit unit is configured to form, through its circuit structure, the n sequences into the intermediate data having k sequences according to the first preset hash algorithm, where n and k are both natural number, and n>k; and the second hash circuit unit is configured to form, through its circuit structure, the k sequences into the target data having u sequences according to the second preset hash algorithm, where u is a natural number, and k>u.

12. The electronic device according to claim 11, wherein the preset hash algorithm is selected from at least one of the following methods: direct addressing method, digital analysis method, middle-square method, folding method, random number method, and division-remainder method.

13. The electronic device according to claim 11, wherein:
the first hash circuit unit comprises at least one of an exclusive OR circuit, a summation circuit, and a shift circuit; and
the second hash circuit unit comprises at least one of an exclusive OR circuit, a summation circuit, and a shift circuit, wherein
when at least one of the first hash circuit unit and the second hash circuit unit comprises the exclusive OR circuit, the number of the exclusive OR circuit is determined according to a difference between n and u; and
when at least one of the first hash circuit unit and the second hash circuit unit comprises the summation circuit,. the number of the summation circuit is determined according to a difference between n and u.

14. The electronic device according to claim 13, wherein the data to be processed is divided into 8 sequences, and the first hash circuit unit comprises:
a first exclusive OR circuit, configured to perform an exclusive OR operation on a first sequence and a second sequence of the data to be processed, so as to form a second intermediate sequence of the intermediate data;
a first summation circuit, configured to perform a summation operation on a third sequence and a fourth sequence of the data to be processed, so as to form a fifth intermediate sequence of the intermediate data;
a first left shift circuit, configured to shift a fifth sequence of the data to be processed to the left, so as to form a fourth intermediate sequence of the intermediate data;
a second exclusive OR circuit, configured to perform an exclusive OR operation on a sixth sequence and an eighth sequence of the data to be processed, so as to form a third intermediate sequence of the intermediate data; and
a first right shift circuit, configured to shift a seventh sequence of the data to be processed to the right, so as to form a first intermediate sequence of the intermediate data.

* * * * *